United States Patent
Tzannes et al.

(10) Patent No.: US 8,718,179 B2
(45) Date of Patent: May 6, 2014

(54) MULTICARRIER COMMUNICATION WITH VARIABLE OVERHEAD RATE

(75) Inventors: Michael A. Tzannes, Lexington, MA (US); Marcos C. Tzannes, Orinda, CA (US)

(73) Assignee: Intellectual Ventures II LLC, Wilmington, DE (US)

( * ) Notice: Subject to any disclaimer, the term of this patent is extended or adjusted under 35 U.S.C. 154(b) by 798 days.

(21) Appl. No.: 11/433,624

(22) Filed: May 15, 2006

(65) Prior Publication Data

US 2006/0251123 A1    Nov. 9, 2006

Related U.S. Application Data

(60) Continuation of application No. 10/202,688, filed on Jul. 25, 2002, now abandoned, which is a division of application No. 09/622,486, filed as application No. PCT/US99/14467 on Jun. 25, 1999, now Pat. No. 6,522,666.

(60) Provisional application No. 60/090,891, filed on Jun. 26, 1998.

(51) Int. Cl.
*H04L 27/00*    (2006.01)

(52) U.S. Cl.
USPC ............................................. 375/295

(58) Field of Classification Search
USPC ............ 375/295; 327/291; 332/106; 341/20, 341/173; 370/477, 471, 472, 473
See application file for complete search history.

(56) References Cited

U.S. PATENT DOCUMENTS

| | | | |
|---|---|---|---|
| 3,573,380 A | | 4/1971 | Darlington |
| 3,798,378 A | * | 3/1974 | Epstein ..................... 370/510 |
| 4,131,766 A | | 12/1978 | Narasimha |
| 4,568,156 A | | 2/1986 | Dane |
| 4,679,227 A | | 7/1987 | Hughes-Hartogs |
| 4,727,536 A | * | 2/1988 | Reeves et al. ............... 370/468 |
| 4,731,816 A | | 3/1988 | Hughes-Hartogs |
| 4,791,652 A | * | 12/1988 | McEachern et al. ......... 375/362 |
| 4,802,190 A | | 1/1989 | Immink |
| 4,912,763 A | | 3/1990 | Galand et al. |
| 5,048,054 A | | 9/1991 | Eyuboglu et al. |
| 5,128,964 A | | 7/1992 | Mallory |
| 5,206,886 A | | 4/1993 | Bingham |
| 5,267,261 A | | 11/1993 | Blakeney, II et al. |

(Continued)

FOREIGN PATENT DOCUMENTS

| | | |
|---|---|---|
| EP | 0 652 677 | 5/1995 |
| EP | 0 473 465 | 3/1996 |

(Continued)

OTHER PUBLICATIONS

European Search Report, Date of Mailing Jul. 22, 2004.

(Continued)

*Primary Examiner* — Shuwang Liu
*Assistant Examiner* — Helene Tayong
(74) *Attorney, Agent, or Firm* — Schwabe, Williamson & Wyatt, P.C.

(57) ABSTRACT

In the present invention, the overhead data transmission rate in a multicarrier communication system (1) may be changed and/or selected. More specifically, this rate may be selected during an initial negotiation process and/or during a steady state mode of operation.

17 Claims, 5 Drawing Sheets

(56) References Cited

U.S. PATENT DOCUMENTS

| | | | |
|---|---|---|---|
| 5,285,474 | A | 2/1994 | Chow et al. |
| 5,327,574 | A | 7/1994 | Monma et al. |
| 5,377,192 | A | 12/1994 | Goodings et al. |
| 5,400,322 | A | 3/1995 | Hunt et al. |
| 5,428,790 | A | 6/1995 | Harper et al. |
| 5,452,288 | A | 9/1995 | Rahuel et al. |
| 5,479,447 | A | 12/1995 | Chow et al. |
| 5,497,398 | A | 3/1996 | Tzannes et al. |
| 5,521,906 | A | 5/1996 | Grube et al. |
| 5,533,008 | A | 7/1996 | Grube et al. |
| 5,555,244 | A | 9/1996 | Gupta et al. |
| 5,594,949 | A | 1/1997 | Andersson et al. |
| 5,596,604 | A | 1/1997 | Cioffi et al. |
| 5,598,435 | A | 1/1997 | Williams |
| 5,604,731 | A * | 2/1997 | Grossglauser et al. ....... 370/232 |
| 5,625,651 | A | 4/1997 | Cioffi |
| 5,634,192 | A | 5/1997 | Meche et al. |
| 5,636,246 | A | 6/1997 | Tzannes et al. |
| 5,644,573 | A | 7/1997 | Bingham et al. |
| 5,673,290 | A | 9/1997 | Cioffi |
| 5,682,419 | A | 10/1997 | Grube et al. |
| 5,708,659 | A | 1/1998 | Rostoker et al. |
| 5,731,706 | A | 3/1998 | Koeman et al. |
| 5,757,813 | A * | 5/1998 | Raith ............................ 714/708 |
| 5,805,669 | A | 9/1998 | Bingel et al. |
| 5,812,599 | A | 9/1998 | Van Kerckhove |
| 5,822,372 | A | 10/1998 | Emami |
| 5,822,374 | A | 10/1998 | Levin |
| 5,832,387 | A | 11/1998 | Bae et al. |
| 5,852,630 | A * | 12/1998 | Langberg et al. ............. 375/219 |
| 5,852,633 | A | 12/1998 | Levin et al. |
| 5,856,988 | A | 1/1999 | Kiriyama |
| 5,903,608 | A | 5/1999 | Chun |
| 5,933,454 | A | 8/1999 | Cioffi |
| 5,943,376 | A * | 8/1999 | Proctor et al. ................ 375/358 |
| 5,953,322 | A * | 9/1999 | Kimball ........................ 370/328 |
| 5,960,036 | A | 9/1999 | Johnson et al. |
| 5,970,407 | A | 10/1999 | Brunner et al. |
| 6,005,893 | A | 12/1999 | Hyll |
| 6,009,328 | A | 12/1999 | Muszynski |
| 6,014,425 | A | 1/2000 | Bingel et al. |
| 6,028,486 | A | 2/2000 | Andre |
| 6,035,197 | A | 3/2000 | Haberman et al. |
| 6,052,411 | A | 4/2000 | Mueller et al. |
| 6,055,297 | A | 4/2000 | Terry |
| 6,065,060 | A | 5/2000 | Liu et al. |
| 6,072,779 | A | 6/2000 | Tzannes et al. |
| 6,073,179 | A | 6/2000 | Liu et al. |
| 6,092,122 | A | 7/2000 | Liu et al. |
| 6,101,216 | A | 8/2000 | Henderson et al. |
| 6,128,335 | A | 10/2000 | Liu et al. |
| 6,128,349 | A * | 10/2000 | Chow ............................ 375/260 |
| 6,144,696 | A | 11/2000 | Shively et al. |
| 6,151,307 | A * | 11/2000 | Gauthier et al. ............. 370/248 |
| 6,161,203 | A | 12/2000 | Zuranski et al. |
| 6,219,378 | B1 | 4/2001 | Wu |
| 6,229,855 | B1 | 5/2001 | Takatori et al. |
| 6,252,861 | B1 | 6/2001 | Bernstein et al. |
| 6,266,702 | B1 | 7/2001 | Darnell et al. |
| 6,278,709 | B1 | 8/2001 | Walker et al. |
| 6,292,496 | B1 * | 9/2001 | Rasanen ........................ 370/503 |
| 6,307,839 | B1 * | 10/2001 | Gerszberg et al. ............ 370/235 |
| 6,351,487 | B1 | 2/2002 | Lu et al. |
| 6,442,150 | B1 | 8/2002 | Kondo et al. |
| 6,480,475 | B1 * | 11/2002 | Modlin et al. ................ 370/294 |
| 2003/0007509 | A1 | 1/2003 | Tzannes et al. |

FOREIGN PATENT DOCUMENTS

| | | |
|---|---|---|
| EP | 0 703 685 | 3/1996 |
| EP | 0 753 947 | 1/1997 |
| EP | 0 753 948 | 1/1997 |
| EP | 0 762 701 | 3/1997 |
| EP | 0 812 087 | 12/1997 |
| EP | 0 820 168 | 1/1998 |
| EP | 0 828 363 | 3/1998 |
| EP | 0 833 474 | 4/1998 |
| EP | 0 840 474 | 5/1998 |
| EP | 0 869 647 | 10/1998 |
| EP | 0 905 948 | 3/1999 |
| EP | 0 916 193 | 5/2000 |
| JP | 60-112357 | 6/1985 |
| JP | 62-502932 | 11/1987 |
| JP | 8-265332 | 10/1996 |
| JP | 8 265332 | 10/1996 |
| JP | 11-168515 | 6/1999 |
| WO | WO 86/07223 | 12/1986 |
| WO | 95/04419 A1 | 2/1995 |
| WO | WO 97/15131 | 4/1997 |
| WO | WO 98/10556 | 3/1998 |
| WO | WO 98/27665 | 6/1998 |
| WO | 9857512 A1 | 12/1998 |
| WO | WO 98/57472 | 12/1998 |
| WO | WO 98/59476 | 12/1998 |
| WO | WO 99/16224 | 4/1999 |
| WO | WO 99/18701 | 4/1999 |
| WO | WO 99/20027 | 4/1999 |

OTHER PUBLICATIONS

Atungsiri et al., "Multirate Coding for Mobile Communications Link Adaptation", pp. 211-216, Jun. 1997, IEEE Proc. Communications, 144(3).

Bingham, John A. C., "Multicarrier Modulation for Data Transmission: An Idea Whose Time Has Come", pp. 5-14, May 1990, IEEE Communications Magazine.

Bingham, John A. C., "RFI Suppression in Multicarrier Transmission Systems", pp. 1026-1030, May 1996, IEEE Communications Magazine.

Cioffi, John M., "A Multicarrier Primer", pp. 1-18, Amati Communications Corporation and Stanford University.

Galand, C and Esteban, D., "16 KBPS Sub-Band Coder Incorporating Variable Overhead Information", pp. 1684-1687, IEEE 1982.

Shoham et al., "Efficient Bit Allocation for an Arbitrary Set of Quantizers", pp. 1445-1453, Sep. 1998, IEEE Transactions on Acoustics, Speech and Signal Processing, 36(9).

Related U.S. Appl. No. 09/597,926 with Preliminary Amendment as filed.

Office Action, mailed Jan. 13, 2006, for U.S. Appl. No. 10/202,688, 10 pages.

Final Office Action, mailed Feb. 24, 2004, for U.S. Appl. No. 09/622,468, 25 pages.

Notice of Allowability, mailed Sep. 27, 2005, for U.S. Appl. No. 09/622,468, 6 pages.

Office Action, mailed Feb. 9, 2005, for U.S. Appl. No. 09/622,468, 25 pages.

Office Action, mailed Aug. 4, 2003, for U.S. Appl. No. 09/622,468, 24 pages.

Notice of Allowability, mailed Jul. 17, 2002, for U.S. Appl. No. 09/622,486, 3 pages.

Office Action, mailed Apr. 9, 2002, for U.S. Appl. No. 09/622,486, 8 pages.

Notice of Allowability, mailed Aug. 26, 2002, for U.S. Appl. No. 09/622,486, 3 pages.

Office Action, mailed Nov. 10, 2005, for CA Patent Application 2335865, 3 pages.

Office Action, mailed Feb. 20, 2004, for AU Patent Application 2002-301627, 2 pages.

Office Action, mailed Sep. 15, 2005, for AU Patent Application 2004-203322, 2 pages.

Office Action, mailed Mar. 10, 2009, for AU Patent Application 2007-202930, 2 pages.

Search Report, mailed Apr. 26, 2006, for EP Patent Application 06004566.3, 3 pages.

Office Action, mailed Mar. 31, 2006, for KR Patent Application 2000-7014830, 3 pages.

Office Action, mailed Oct. 27, 2006, for KR Patent Application 2000-7014830, 3 pages.

(56) References Cited

OTHER PUBLICATIONS

International Search Report, mailed Oct. 25, 1999, for PCT/US99/14467, 3 pages.
Preliminary Exam, mailed Jun. 10, 2000, for PCT/US99/14467, 13 pages.
Bingham et al., "T1.413 Issue 2," Standards Project for Interfaces Relating to Carrier to Customer Connection of Asymmerical Digital Subscriber Line (ADSL) Equipment, T1E1.4, Jun. 1, 1998, 287 pages.
Office Action for CA Patent Application 2335865, mailed Apr. 26, 2007, 2 pages.
Office Action for KR Patent Application 2000-7014830, mailed Jul. 19, 2007, 4 pages.
Official Action for European Patent Application No. 6004566.3, dated Jul. 27, 2010, 4 pages.
Notice of Allowance for Korean Patent Application No. 2000-7014830 dated Mar. 29, 2010, 4 pages.
Official Action for Korean Patent Application No. 10-2010-7002843 dated Mar. 29, 2010, 3 pages.
Notice of Allowance for Korean Patent Application No. 10-2010-7002843, mailed Dec. 24, 2010, 4 pages.
Official Action for Korean Patent Application No. 10-2010-7021589, mailed Jan. 4, 2011, 4 pages.
Cioffi, J. M., "The Essential Merit of Bit-Swapping," ATIS Contribution T1E1, 1998, 4 pages.

\* cited by examiner

MULTICARRIER COMMUNICATION WITH VARIABLE OVERHEAD RATE

CROSS-REFERENCE TO RELATED APPLICATIONS

This application is a continuation of U.S. patent application Ser. No. 10/202,688, filed Jul. 25, 2002, now pending, which claims the benefit of and priority to U.S. patent application Ser. No. 09/622,486, filed Sep. 12, 2000, now U.S. Pat. No. 6,522,666, issued Feb. 18, 2003, which is a National Stage Application under 35 U.S.C. §371 of International Application No. PCT/US99/14467, filed on Jun. 25, 1999, which claims the benefit of and priority to U.S. Provisional Application Ser. No. 60/090,891 filed Jun. 26, 1998, all of which are incorporated herein by references in their entirety.

BACKGROUND OF THE INVENTION

1. Field of the Invention

This invention relates generally to communications, and more particularly, to a multicarrier communications system and method that are able to controllably change an overhead channel data transmission rate.

2. Description of Related Prior Art

The public switched telephone network (PSTN) provides the most widely available form of electronic communication for most individuals and businesses. Because of its ready availability and the substantial cost of providing alternative facilities, it is increasingly being called upon to accommodate the expanding demands for transmission of substantial amounts of data at high rates. Structured originally to provide voice communication with its consequent narrow bandwidth requirements, the PSTN increasingly relies on digital systems to meet the service demand.

A major limiting factor in the ability to implement high rate digital transmission has been the subscriber loop between the telephone central office (CO) and the premises of the subscriber. This loop most commonly comprises a single pair of twisted wires which are well suited to carrying low-frequency voice communications for which a bandwidth of 0-4 kHz is quite adequate, but which do not readily accommodate broadband communications (i.e., bandwidths on the order of hundreds of kilohertz or more) without adopting new techniques for communication.

One approach to this problem has been the development of discrete multitone digital subscriber line (DMT DSL) technology and its variant, discrete wavelet multitone digital subscriber line (DWMT DSL) technology. These and other forms of discrete multitone digital subscriber line technology (such as ADSL, HDSL, etc.) will commonly be referred to hereinafter generically as "DSL technology" or frequently simply as "DSL". The operation of discrete multitone systems, and their application to DSL technology, is discussed more fully in "Multicarrier Modulation For Data Transmission: An Idea Whose Time Has Come," *IEEE Communications Magazine*, May, 1990, pp. 5-14.

In DSL technology, communications over the local subscriber loop between the central office and the subscriber premises is accomplished by modulating the data to be transmitted onto a multiplicity of discrete frequency carriers which are summed together and then transmitted over the subscriber loop. Individually, the carriers form discrete, non-overlapping communication subchannels of limited bandwidth; collectively, they form what is effectively a broadband communications channel. At the receiver end, the carriers are demodulated and the data recovered from them.

The data symbols that are transmitted over each subchannel carry a number of bits that may vary from subchannel to subchannel, dependent on the signal-to-noise ratio (SNR) of the subchannel. The number of bits that can accommodated under specified communication conditions is known as the "bit allocation" of the subchannel, and is calculated for each subchannel in a known manner as a function of the measured SNR of the subchannel and the bit error rate associated with it.

The SNR of the respective subchannels is determined by limiting a reference signal over the various subchannels and measuring the SNR's of the received signals. The loading information is typically calculated at the receiving or "local" end of the subscriber line (e.g., at the subscriber premises, in the case of transmission from the central telephone office to the subscriber, and at the central office in the case of transmission from the subscriber premises to the central office) and is communicated to the other (transmitting or "remote") end so that each transmitter-receiver pair in communication with each other uses the same information for communication. The bit allocation information is stored at both ends of the communication pair link for use in defining the number of bits to be used on the respective subchannels in transmitting data to a particular receiver. Other subchannel parameters such as subchannel gains, time and frequency domain equalizer coefficients, and other characteristics may also be stored to aid in defining the subchannel.

Information may, of course, be transmitted in either direction over the subscriber line. For many applications, such as the delivery of video, internet services, etc. to a subscriber, the required bandwidth from central office to subscriber is many times that of the required bandwidth from subscriber to central office. One recently developed service providing such a capability is based on discrete multitone asymmetric digital subscriber line (DMT ADSL) technology. In one form of this service, up to two hundred and fifty six subchannels, each of 4312.5 Hz bandwidth, are devoted to downstream (from central office to subscriber premises) communications, while up to thirty two subchannels, each also of 4312.5 Hz bandwidth, provide upstream (from subscriber premises to central office) communications. Communication is by way of "frames" of data and control information. In a presently-used form of ADSL communications, sixty eight data frames and one synchronization frame form a "superframe" that is repeated throughout the transmission. The data frames carry the data that is to be transmitted; the synchronization or "sync" frame provides a known bit sequence that is used to synchronize the transmitting and receiving modems and that also facilitates determination of transmission subchannel characteristics such as signal-to-noise ratio ("SNR"), among others.

A DMT standard has been set for DSL transmission by the ANSI Standards body for full-rate ADSL in the publication "T1E1.4/97-007R6 Interface between network and customer installation asymmetric digital subscriber line (ADSL) metallic interface," published Sep. 26, 1997—referred to hereinafter as "T1.413 issue 2". This standard has also been recommended as the standard modulation technique to be used for splitterless DSL operation by the Universal ADSL Working Group (UAWG) (See: "Universal ADSL Framework Document TG/98-10R1.0," published by the UAWG on Apr. 22, 1998, and referred to hereinafter as "UADSL specification"). A variation of this standardized DMT technique is also expected to be approved as a standard, termed G.Lite," by the International Telecommunications Union. According to these standardized DMT techniques, hundreds of 4.3125 kiloHertz (kHz) subchannels are used for DSL transmissions between a telephone company central office (CO) and remote terminal (RT) or customer premises (at a home or business). Data are transmitted in both the downstream direction (from the CO to the RT) and the upstream direction (from the RT to the CO). According to these standards, the aggregate bandwidth (i.e. the sum of the bandwidths used in both upstream and downstream transmissions) of a full rate ADSL system is over 1 megaHertz (MHz), while that of G.Lite is over 500 kHz.

A superframe is 17 milliseconds in duration. A frame is effectively 250 micro-seconds in duration (or conversely, the frame rate is approximately 4 kHz) and is made up of a collection of bytes (with one byte corresponding to 8 bits).

After one DSL modem has initialized and established an active communication session with another DSL modem, the modems enter a steady state or information transmission mode. In this mode, data are transported in the upstream direction and the downstream direction at data rates that were determined during the initialization process in which the session was established. During steady state mode, each frame of data transmitted/received by the modem is made up of an overhead section and a payload section. The overhead section carries information that is used to manage the communications between the two communicating DSL modems, while the payload section contains the actual (e.g., user) data to be communicated between the modems. In DSL communications that conform to the DMT communications standards whose specifications are referenced above, the first byte of each frame of data is designated as an overhead byte. The overhead section may comprise cyclic redundancy check (CRC) data, indicator bit (IB) data, embedded operations channel (EOC) data and ADSL overhead channel (AOC) data. Cyclic redundancy data are used to check the integrity of the communications link between the two DSL modems. Indicator bit data are used to indicate certain communications error conditions that may occur during the communications session. EOC and AOC data provide information concerning the status of the communications session. The format and information provided by these portions of overhead data are described in detail in T1.413 Issue 2. (See, e.g., Sections 6.4.1.3, 8.1, 10.1 and Table 3 of the T1.413 Issue 2)

As described in T1.413 Issue 2, data can be transported between the communicating modems during a given DSL communications session either with data interleaving or without data interleaving. If data interleaving is employed, the transported data are channeled through an "Interleave Buffer". Conversely, if transported data are not interleaved, the data may be channeled through a "Fast Buffer". As noted previously, the first byte in each frame is an overhead data byte. When data interleaving is employed, this overhead byte is termed a "sync byte"; however, when interleaving is not employed, the overhead byte may be termed a "fast byte."

Table 1 below is taken from Table 7 of the T1.413 Issue 2, and illustrates how overhead data may be distributed in frames transmitted during a conventional DSL communications session, wherein a "reduced overhead mode" of operation is employed. As is described in detail in Section 6.4.4.2 of the T1.413 Issue 2, in the "reduced overhead mode" of operation, the sync or fast bytes are "merged."

TABLE 1

Overhead functions for reduced overhead mode - with merged fast and sync bytes

| Frame Number | (Fast Buffer Only) Fast Byte Format | (Interleaved Buffer Only) Sync Byte Format |
| --- | --- | --- |
| 0 | Fast CRC | Interleaved CRC |
| 1 | IB0-7 | IB0-7 |
| 34 | IB8-15 | IB8-15 |
| 35 | IB16-23 | IB16-23 |
| 4n+2, 4n+3 with n=0...16 n≠8 | EOC | EOC |
| 4n, 4n+1 with n=0...16, n≠0 | AOC | AOC |

As depicted in Table 1 above, the first overhead byte in the first frame is used to transport CRC data. The first byte in the second frame is used to transport the first 8 indicator bits. The first byte in the $34^{th}$ frame is used to transport the eighth through the fifteenth indicator bits. The first byte in the $35^{th}$ frame is used to transport the sixteenth through the twenty-third indicator bits. The first byte in all the remaining frames alternates between either EOC data or AOC data. However, in this conventional scheme, when actual EOC or AOC data are not available for transport, which can often occur when according to the scheme, EOC or AOC data are to be comprised in a frame, predetermined dummy bytes are used instead of unavailable actual EOC or AOC data.

Unfortunately, since one byte out of each frame in each superframe during conventional DSL communications is dedicated to overhead data, the corresponding overhead data rate is invariably fixed at 32 kbps, and is not changed when either the payload data transmission rate changes or when no actual EOC or AOC data are available for inclusion in the frame. Further, some telephone lines used in DSL communications are of such poor quality that the maximum possible DSL data transmission rate using such lines may not exceed 128 kbps. Unfortunately, this means that when DSL communications are carried out over such poor quality lines, an undesirably large proportion (e.g., up to twenty-five percent) of the DSL communications system's throughput may be used to transmit overhead data. At any given time during a given communications session, the total communications bandwidth is constant. Thus, since the total data communications transmission rate either upstream or downstream, as the case may be, at any given time during a DSL communications session, is constant, this means that communications bandwidth that otherwise would be available to transmit payload data is unnecessarily consumed in transmitting overhead data.

Objects of the Invention

In general, it is an object of the present invention to provide a multicarrier communications system and method that overcome the aforesaid and/or other disadvantages and drawbacks of the prior art, and more specifically, to provide such a system and method wherein the overhead data transmission rate during a communications session may be changed and/or selected.

SUMMARY OF THE INVENTION

Accordingly, a multicarrier communications system and method are provided that are able to overcome the aforesaid and other disadvantages and drawbacks of the prior art. In the system and method of the present invention, the overhead data transmission rate may be changed and/or selected. More specifically, this rate may be selected during an initial negotiation process and/or during a steady state mode of operation.

In one embodiment, the system of the present invention may comprise two DMT DSL modems, one located at a customer premises and another located at a telephone central office, connected by a conventional POTS line through which the modems communicate by transmitting and receiving discrete frames and superframes of data. Within each superframe are 68 data frames and a synchronization symbol. Within each frame is a number of bytes that are allocated to payload and overhead data. The allocation of the bytes to either overhead or payload data is flexible (i.e., changeable and/or selectable). Whereas in the prior art, the first byte in each frame is dedicated to overhead data regardless of whether there is a need to transport overhead data or not, in this embodiment of the present invention, the overhead data transmission rate is determined during start-up and can be modified during steady state mode. Due to the construction of frames in DSL systems, decreasing the overhead data transmission rate during steady state mode results in a higher payload data transmission rate, while conversely, increasing the overhead data transmission rate during steady state mode results in a lower payload data transmission rate.

Flexible Overhead Allocation

As noted previously, in conventional DSL systems, one byte per frame is dedicated to overhead data. In the improved system of this embodiment of the present invention, both the number of bytes and the frame(s) comprising overhead data may be selected. By selecting the number of frames that comprise overhead data, and the number of bytes allocated to overhead data in those frames, the amount of throughput that is dedicated to overhead data can modified. This is a marked departure from conventional DSL systems wherein the amount of throughput that is dedicated to overhead data is unchangeably fixed at 32 kbps.

Similarly, in this embodiment of the present invention, it is possible to select which of the superframes are to carry overhead data-containing frames. This introduces another degree of freedom in allocating the overhead and payload data transmission rates.

Also advantageously, since the overhead data transmission rate is selectable in this embodiment of the present invention, it is possible to select that rate based upon the relative priorities that are desired to be given to transmission of payload and overhead data, and/or whether there is a need to have a high overhead data transmission rate because a given application requires it (e.g., if compressed voice data is to be transported via an overhead data channel).

Control commands may be exchanged between the modems during their initial negotiation or handshake phase that may govern how many and which of the frames and/or superframes may contain overhead data, and the number of bytes of such data in the effected frames. These control commands may comprise respective messages whose receipt by a modem during initial negotiation may cause the modem to select from a plurality of sets of parameters, a respective set of parameters that will govern how many and which frames and/or superframes will contain overhead data, the number of bytes of such data in the effected frames, etc. during the communications session between the modems. These sets of parameters may be stored in table form in each of the modems, and may designate which the particular bytes, frame(s), and superframe(s) are to be dedicated to overhead data.

Dynamic Overhead Data Throughput Allocation.

In addition to permitting the amount of throughput devoted to overhead data to be selectable, this embodiment may also permit dynamic adjustment of that throughput during steady state operation.

For example, after establishing the overhead data transmission rate during startup negotiation, a new messaging process may allow renegotiating of this data transmission rate during steady state operation, as necessary. For example, a 4 kbps overhead data rate may be initially negotiated during startup, and thereafter, if a large EOC data transfer is required, a new overhead channel data transmission rate (for example 32 kbps) could be negotiated, to permit the overhead data to be quickly transmitted. Upon completion of that data transfer, the overhead data transmission rate may then be renegotiated, as appropriate.

The dynamic renegotiations of the overhead data transmission rate during steady state operations may be effected by exchange of control commands between the central office and customer premises modems, in a manner similar to that used to initially negotiate that rate. These control commands may be exchanged via the overhead channels. Similarly, the commands exchanged may comprise respective messages whose receipt by a modem during renegotiations of the overhead data transfer rate may cause the modem to select form a plurality of sets of parameters, a respective set of parameters that will govern how many and which frames and/or superframes will contain overhead data, the number of bytes of such data in the effected frames, etc. during further communications between the modems. These sets of parameters may be stored in table form in each of the modems and may designate which the particular bytes, frame(s), and superframe(s) are to be dedicated to overhead data. The messages may comprise one or more tones, or may comprise use of a predetermined protocol over an overhead channel, that identify the particular parameter set.

Once the change in overhead data transmission rate has been renegotiated, in order to effectuate further exchange of overhead data, the modems involved in the renegotiation must synchronize their transmission/reception of overhead data in accordance with newly negotiated rate. In accordance with this embodiment of the present invention, there are several alternative techniques by which this synchronization may be accomplished. In the first such technique, the central office modem may keep an internal count of the frames/superframes that have been transmitted from that modem to the customer premises modem with which it has been communicating, and the customer premises modem may likewise keep an internal count of the frames/superframes that it has received from the central office modem. A message may be passed from one of the modems to the other modem that contains a frame/superframe count value at which the two modems are to adjust their overhead data transmit/receive rates in accordance with the newly negotiated rate. Each modem then adjusts its overhead data transmit/receive rate when its respective internal frame/superframe count reaches that value.

Alternatively, one of the modems may transmit to the other modem a flag message indicating that, when the other modem transmits to the modem sending the flag message a specified subsequent superframe (e.g., the next superframe), the overhead data transmission/reception rates are to be adjusted in accordance with the newly negotiated rate. Upon transmission of that specified superframe, the modem that transmitted the superframe adjusts to the newly negotiated rate; likewise, upon receipt of the specified superframe, the modem receiving that superframe adjusts to the newly negotiated rate.

Of course, it will be appreciated that a request to renegotiate the overhead data transmission rate can originate from either the modem at the central office or from the modem at the customer site. Further, that request may be initiated by either the transmit block or the receive block in the modem initiating the request.

These and other features and advantages of the present invention will become apparent as the following Detailed Description proceeds and upon reference to the Figures of the Drawings, wherein:

Although the following Detailed Description will proceed with reference being made to specific embodiments and methods of use, it is to be understood that the present invention is not intended to be limited to these embodiments and methods of use. Rather, as will be appreciated by those skilled in the art, many alternatives, modifications, and variations thereof are possible without departing from present invention. Accordingly, it is intended that the present invention be viewed broadly as encompassing all such alternatives, modifications, and variations as are within the spirit and broad scope of the hereinafter appended claims.

DETAILED DESCRIPTION OF ILLUSTRATIVE EMBODIMENTS

Figure 1:
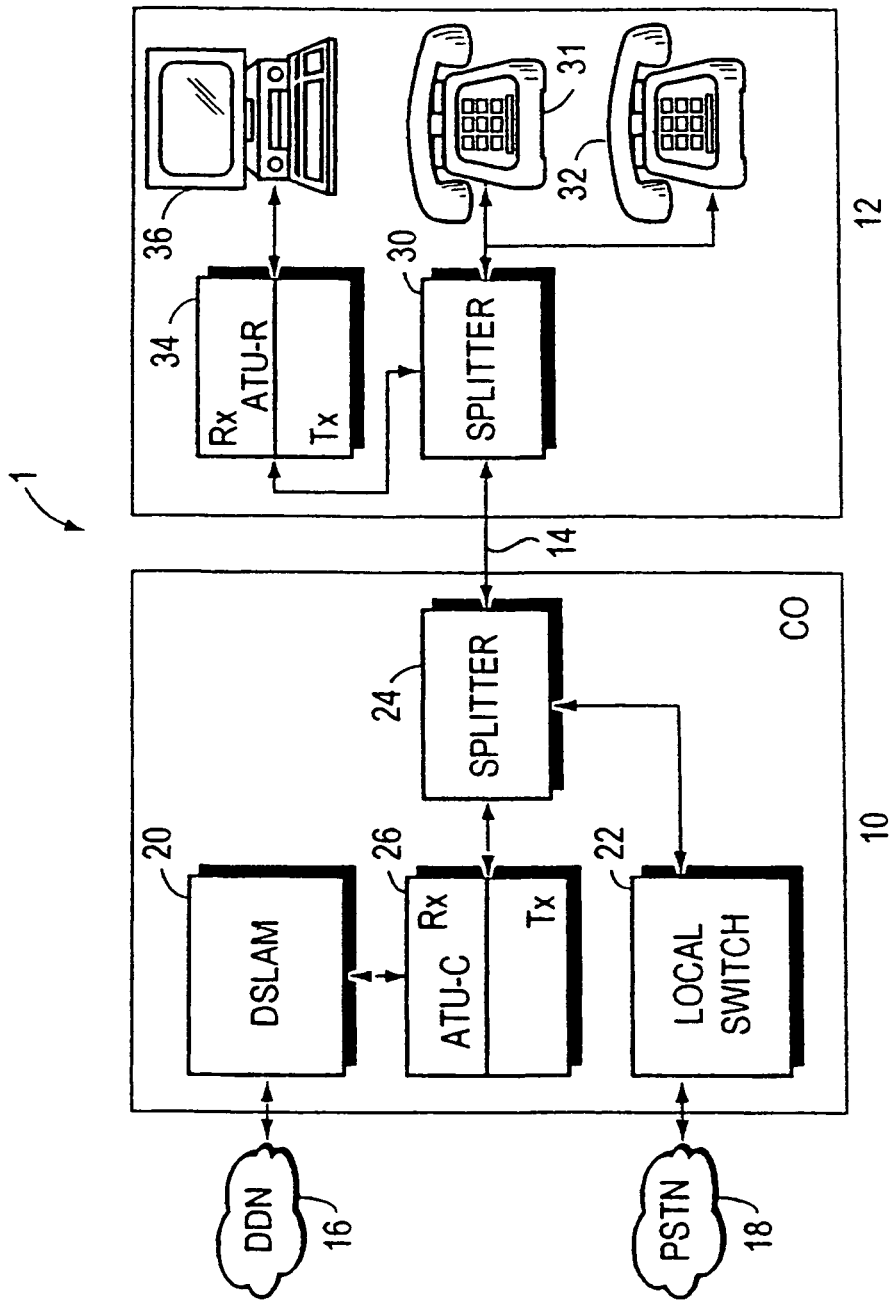
FIG. 1 is a schematic diagram of a DSL system wherein the present invention may be advantageously employed.

FIG. 1 shows a DSL communications system wherein the present invention may be advantageously used. As shown in FIG. 1, a telephone central office ("CO") 10 is connected to a remote subscriber 12 ("CP: Customer Premises") by a subscriber line or loop 14. Typically, the subscriber line 14 comprises a pair of twisted copper wires; this has been the traditional medium for carrying voice communications between a telephone subscriber or customer and the central office. Designed to carry voice communications in a bandwidth of approximately 4 kHz (kilohertz), its use has been greatly extended by DSL technology.

The central office is, in turn, connected to a digital data network ("DDN") 16 for sending and receiving digital data, as well as to a public switched telephone network ("PSTN") 18 for sending and receive voice and other low frequency communications. The digital data network is connected to the central office through a digital subscriber line access multiplexer ("DSLAM") 20, while the switched telephone network is connected to the central office through a local switch bank 22. The DSLAM 20 (or its equivalent, such as a data enabled switch line card) connects to a POTS "splitter" 24 through an ADSL transceiver unit-central office ("ATU-C") 26. The local switch 20 also connects to the splitter.

The splitter 24 separates data and voice ("POTS") signals received from the line 14. At the subscriber end of line 14, a splitter 30 performs the same function. In particular, the splitter 30 passes the POTS signals from line 14 to the appropriate devices such as telephone handsets 31, 32, and passes the digital data signals to an ADSL transceiver unit-subscriber ("ATU-R") 34 for application to data utilization devices such as a personal computer ("PC") 36 and the like. The transceiver 34 may advantageously be incorporated as a card in the PC itself; similarly, the transceiver 26 is commonly implemented as a line card in the multiplexer 20.

In this approach, a communication channel of a given bandwidth is divided into a multiplicity of subchannels, each a fraction of the subchannel bandwidth. Data to be transmitted from one transceiver to another is modulated onto each subchannel in accordance with the information-carrying capacity of the particular subchannel. Because of differing signal-to-noise ("SNR") characteristics of the subchannels, the amount of data loaded onto a subchannel may differ from subchannel to subchannel. Accordingly, a "bit allocation table" is maintained at each transceiver to define the number of bits that each will transmit on each subchannel to the receiver to which it is connected. These tables are created during an initialization process in which test signals are transmitted by each transceiver to the other and the signals received at the respective transceivers are measured in order to determine the maximum number of bits that can be transmitted from one transceiver to the other on the particular line. The bit allocation table determined by a particular transceiver is then transmitted over the digital subscriber line 14 to the other transceiver for use by the other transceiver in transmitting data to that particular transceiver or to any similar transceiver connected to the line 14. The transmission must, of course, be done at a time when the line is not subject to disturbances which may interfere with communications.

It should be appreciated that although the system 1 has been shown as comprising splitters 24, 30, if appropriately modified as described in detail in copending PCT Application Serial No. PCT/US98/21442, entitled "Splitterless Multicarrier Modem," filed Oct. 9, 1998, which is commonly owned by the owner of the subject application, Aware, Inc. of Bedford, Mass., U.S.A., splitters 24, 30 may instead be wholly eliminated from system 1. The entirety of the disclosure of said copending PCT application is incorporated herein by reference.

Also, although not shown in the Figures, it should be understood that each of the transceivers or modems 26, 34 comprises a respective processor, read only and random access memories, and transmitter and receiver circuitry blocks which are interconnected via conventional bus circuitry, and are operable to permit the transceivers 26, 34 to carry out the DSL communications processes and the various other processes according to the present invention described herein. The read only and random access memory of these modems 26, 34 may store program code instructions which are executable by the modems' processors, and when executed by the processors, cause the modems to carry out these processes.

Figure 2:
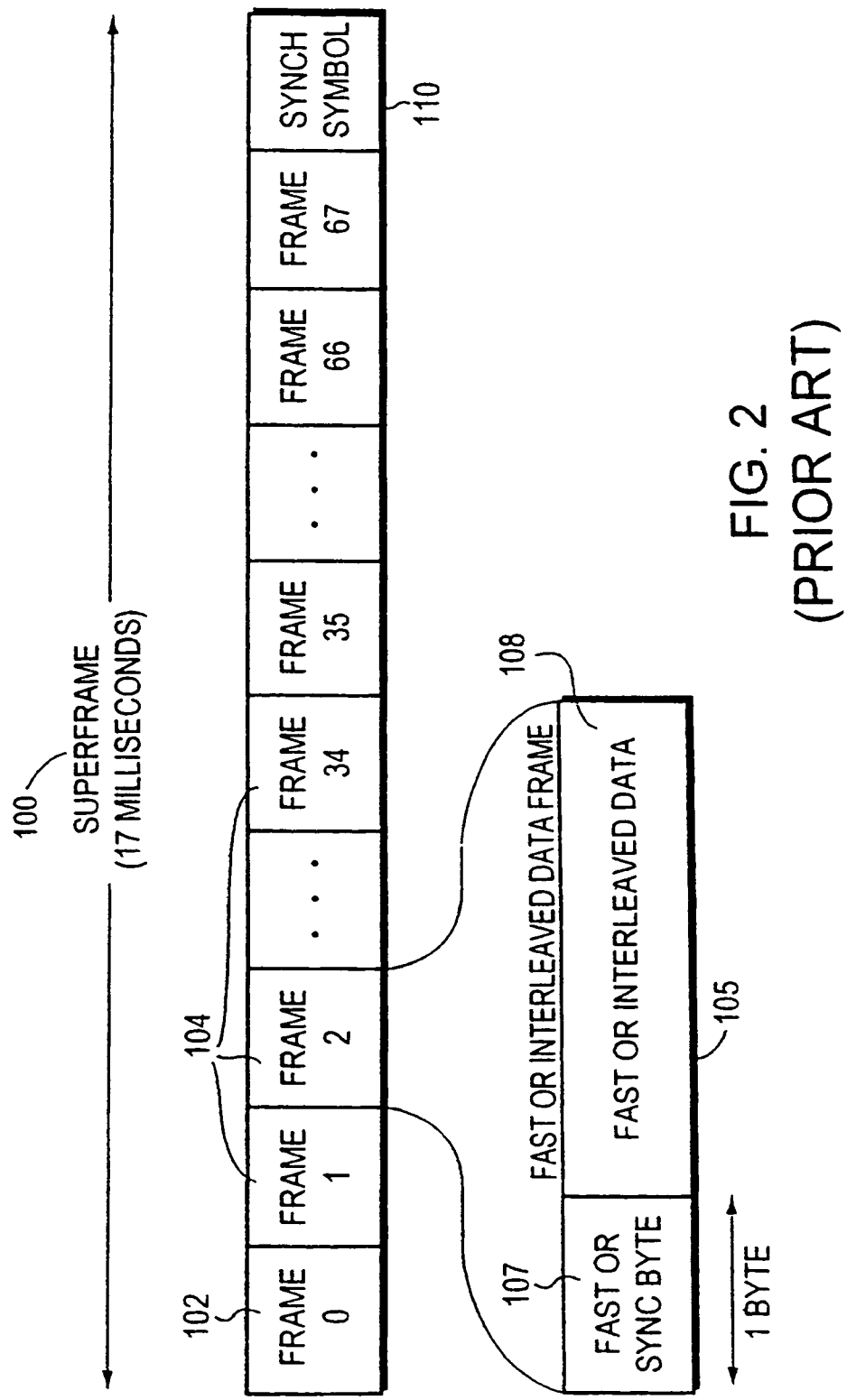
FIG. 2 illustrates a conventional data superframe format.

FIG. 2 shows the format of a conventional DSL data superframe 100. Superframe 100 is made up of sixty eight frames, the first frame 102 in each superframe is designated as frame 0, while each subsequent frame (collectively referred to by number 104) therein up to the sixty-seventh frame is assigned a number that corresponds to its ordinal sequence in the superframe (i.e., Frame 1, Frame 2 . . . Frame 67). Each superframe is terminated with a synchronization symbol 110

Each frame 102, 104, in turn, has structure 105. In frame structure 105, the first byte 107 is either the sync or fast byte, depending upon whether interleaving is being employed, or not, respectively. The remaining bytes 108 in the frame structure 105 are either interleaved data bytes or fast data bytes, depending upon whether interleaving is employed, or not employed, respectively.

Figure 3:
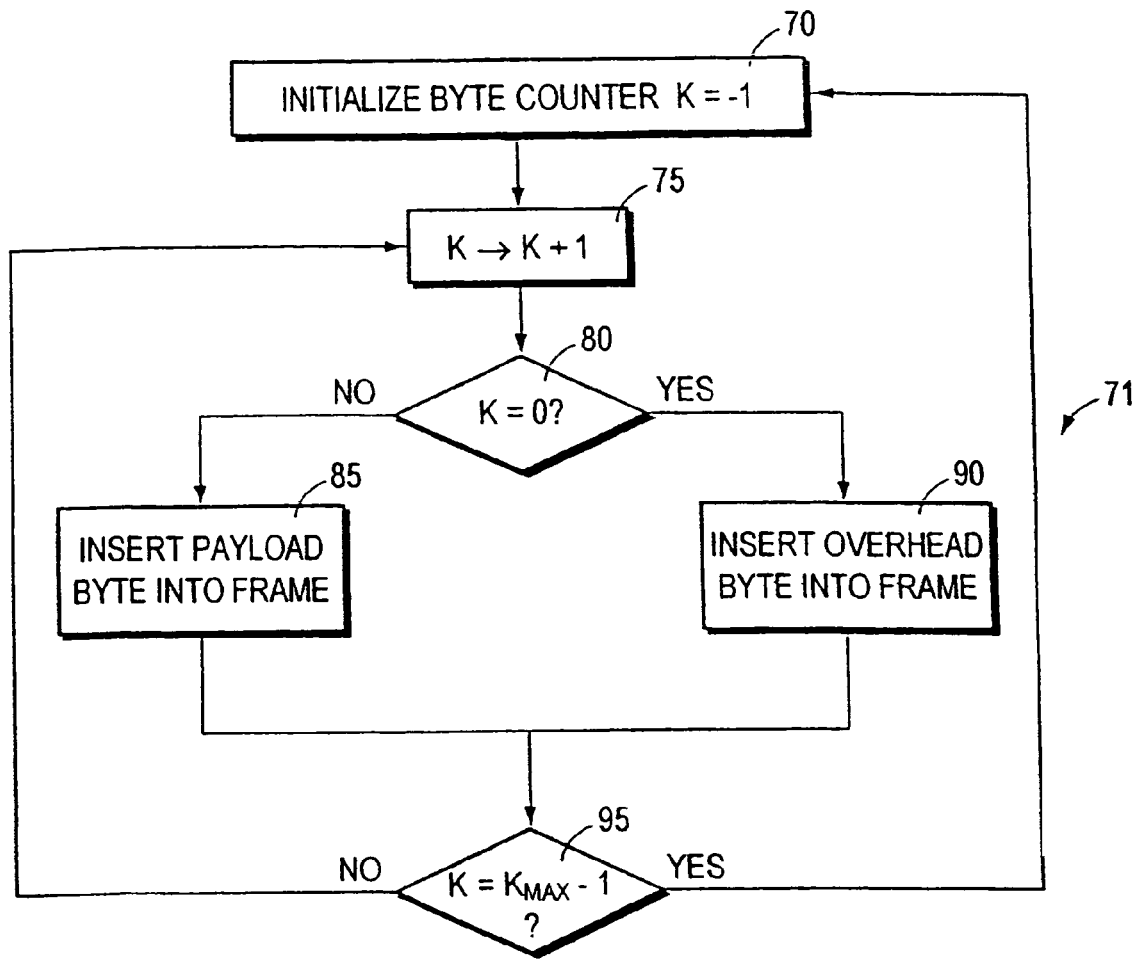
FIG. 3 is a flowchart of a conventional process for generating a data frame.

FIG. 3 depicts a flowchart of a conventional process 71 which heretofore as been used to determine allocation of overhead and payload bytes in each frame structure 105 to be generated for transmission. That is, prior to the present invention, the process 71 has been used by conventional DSL transceivers when generating frames for transmission. Process 71 then begins by initializing a byte counter k to the value of k=−1 (step 70). Thereafter, the counter is incremented by 1 (step 75), and the incremented counter value is compared to zero (step 80). If the incremented counter value equals zero, then an overhead data byte is generated and inserted into the frame (step 90). The type of overhead data byte that is generated at step 90 is determined in accordance with the information presented Table 1, described previously. The incremented counter value is then compared to the number of bytes (kmax) to be included in the frame to be generated minus unity (step 95), and if the incremented counter value is equal to kmax minus unity, then the process flow loops back to step 70. Alternatively, if the incremented counter value does not equal kmax minus unity, then the process flow loops back to step 75.

Conversely, if at step 80, the incremented counter value k is not zero, then a payload data byte is generated and concatenated with the last byte previously inserted into the frame. Thereafter, the process 71 continues to step 95. Step 95 determines whether the frame is full, i.e. whether all the bytes kmax that are to be transported in the frame concatenated to the frame.

As noted previously, using this prior art frame construction process 71 ensures a static overhead data transmission rate in a conventional DSL communications system. In accordance with one embodiment the present invention, system 1 implements negotiation and frame generation techniques that permit the overhead data transmission rate in system 1 to be dynamically adjustable.

New Overhead Allocation Table

In accordance with the present invention, the value of a new variable "$n_{max}$" is negotiated by the transceivers 26, 34 at initialization and/or at steady state. By appropriately negotiating this value, the EOC/AOC channel can be programmed to have a transmission rate that is between a minimum of approximately 2 kbps and a maximum of approximately 30 kbps. The manner in which the value selected for $n_{max}$ affects the overhead data transmission rates, and the frames in which overhead data exists, is summarized in Table 2 infra.

For example, by selecting $n_{max}$ to be less than 16, more of the throughput of system 1 can be allocated to payload data when the EOC/AOC requirements are limited. For example, if $n_{max}$ is selected to be 2, then frames having numbers 0, 1, 2, 3, 4, 5, 6, 7, 8, 9, 10, 11, and 34, 35 in each superframe will have a first byte that is an overhead byte. The remaining 54 frames (of the 68 total frames) in a superframe will not have an overhead byte as the first byte in the frame. The total overhead data rate (based upon all EOC/AOC, CRC and indicator bit data) therefore is reduced from 32 kbps to approximately 6.5 kbps.

TABLE 2

Modified Overhead functions for reduced overhead mode - with merged fast and sync bytes

| Frame Number | (Fast Buffer Only) Fast Byte Format | (Interleave Buffer Only) Sync Byte Format |
|---|---|---|
| 0 | Fast CRC | Interleaved CRC |
| 1 | IB0-7 | IB0-7 |
| 34 | IB8-15 | IB8-15 |
| 35 | IB16-23 | IB16-23 |
| 4n+2, 4n+3 with n=0..., $n_{max}$ n≠8 | EOC or sync | EOC or sync |
| 4n, 4n+1 with n=0... $n_{max}$, n≠0 | AOC | AOC |

Figure 4:
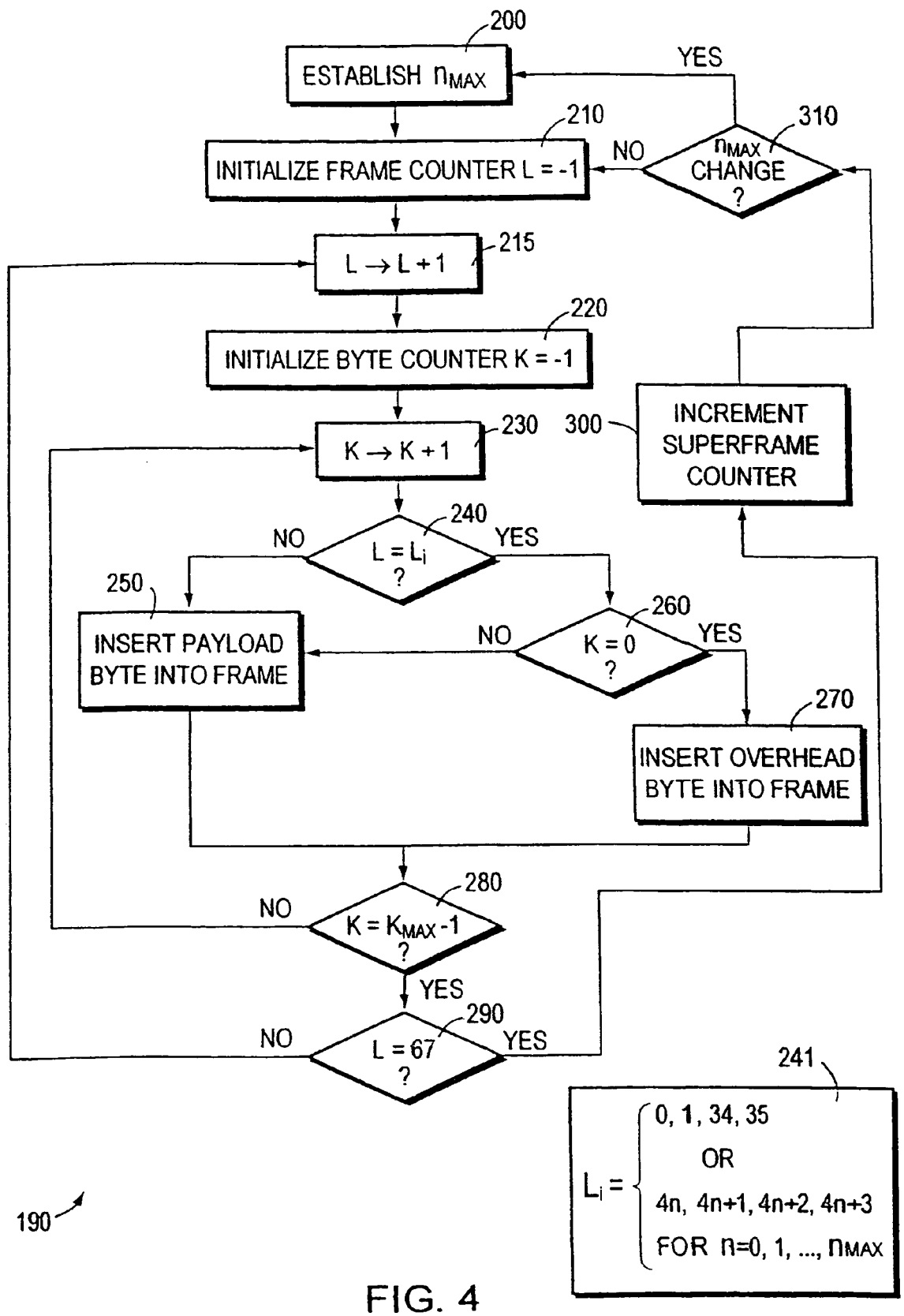
FIG. 4 is a flowchart of an embodiment of a process according to the present invention for generating a data frame.

FIG. 4 is a flowchart of a process 190 for constructing the portion 108 of each frame transmitted in system 1. That is, each transceiver 26, 34 executes the process 190 when constructing a frame to be transmitted to the other transceiver 34, 26, respectively, in system 1. The value of $n_{max}$ is first negotiated (according to a process 193 that is described more fully below) at step 200. Thereafter, a frame counter L is initialized to −1 and incremented by one (steps 210 and 215), and byte counter k is initialized to −1 and incremented by one (steps 220 and 230). The counter L is then compared to the Li values defined in block 241. If L is equal to one of the Li values as shown in block 241, then it is also determined whether the byte counter k is equal to 0 (step 260). If so, then an overhead byte is generated and inserted in the frame (step 270). The content of the overhead byte is determined as set forth in Table 2. If k is not equal to zero at step 260 or if L not equal to one of the Li values at block 240, then a payload data byte is inserted in the frame (step 250). From steps 250 or 270, the process 190 continues to block 280, wherein it is determined whether the end of the frame has been reached by checking whether the byte counter k is equal to kmax minus 1. If kmax is not equal to kmax minus 1, the process 190 flow returns to step 230, and byte counter k is incremented in step 230 and the steps from 240 on are repeated. If k is equal to k minus 1, then the frame counter L is evaluated to determine whether it is equal to 67, which is the maximum value permitted for the frame counter as there are 68 data frames in a superframe (step 290). If the frame counter L has not reached this maximum value, the process 190 loops back to step 215. Conversely, if L is equal to this maximum value, the process 190 branches to step 300 where superframe counter (which was initiated via a separate process step not shown) is incremented by one, and thereafter, it is determined whether the value of $n_{max}$ is to be changed (step 310). If the value of $n_{max}$ is to be changed, then the negotiation process of step 200 is executed. Conversely, if the value of $n_{max}$ is not to changed then the process 190 continues to step 210 and the superframe counter is incremented by one, and the frame and byte counters are reset (steps 210, 220).

The process of FIG. 4 is a preferred because it allows flexibility in the overhead data rate with the introduction of a single new parameter, $n_{max}$. Techniques that involve more parameters, and hence would be more complicated to implement (and would require more modifications to the existing DSL specifications), are also possible, without departing from the present invention.

In this illustrative embodiment, the parameter, $n_{max}$, suffices to give a significant amount of flexibility in the overhead data transmission rate. By incrementing the $n_{max}$ parameter by integer increments, overhead data rates can be incremented in approximately 2 kbps steps. As overhead data rates are decreased, payload data rates increase and vice versa.

Also, in this illustrative embodiment 1, a new EOC command is defined to allow the EOC/AOC channel data rate to be increased after startup, thereby permitting the frame structure to be changed "on-the-fly" during on-going communications between the modems 26, 34. This EOC command causes renegotiation of the $n_{max}$ parameter from the value to which it was originally set during initial negotiation in order to increase or decrease the EOC/AOC channel data rates. The format of this command may vary depending upon the particular manner in which the system 1 is constructed.

Figure 5:
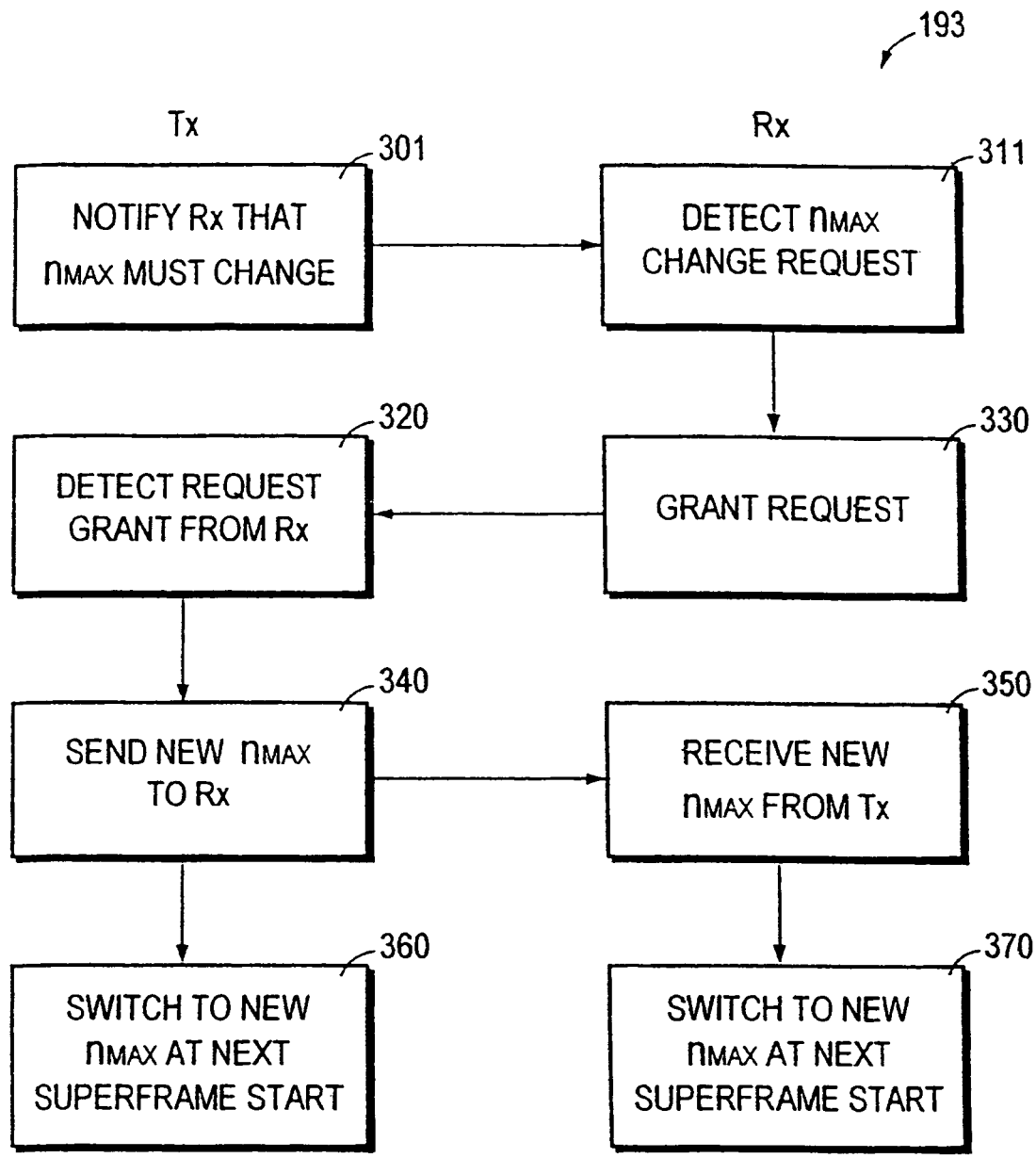
FIG. 5 is a flowchart illustrating an embodiment of a process according to the present invention for renegotiating overhead data transmission rate during a steady state mode of operation.

With reference now being made to FIG. 5, a process 193 that is implemented by the transceivers 26, 34 to negotiate the value $n_{max}$ that is to be used by the transceivers 26, 34 in constructing frames to be transmitted to each other is described. For purposes of this negotiation, it is assumed that the transceivers 26, 34 in system 1 have already entered steady state mode prior to beginning process 193. The transmit circuitry block TX comprised within either or both of the transceivers 26, 34 notifies the receive circuitry RX block comprised in the other transceiver 34, 26, respectively that the to transceiver 26, 34 comprising the block TX desires to change the overhead data rate (step 301). The RX block in transceiver 34, 26, respectively, detects the change (step 311) and grants the request by sending a message to the TX block of the transceiver 26, 34 (step 330). Thereafter, in step 320, the TX block of transceiver 26, 34 detects the grant of the change request message and sends another message (step 340) to the RX block of transceiver 34, 26 defining the new $n_{max}$ that is to be used in communications between the transceivers 26, 34. This new $n_{max}$ may be one of a collection of $n_{max}$ options that are already stored in the TX and RX of the transceivers, and the message may therefore be a signal for choosing one of the options in the collection. However, in this embodiment, when the RX block receives the new $n_{max}$, the new $n_{max}$ value has effectively been negotiated between the transceivers (step 350). In this embodiment, the new $n_{max}$ is used at the beginning of the next superframe by the two transceivers 26, 34. The steps shown in FIG. 4 are then followed to construct that superframe. Of course, the process 193 may also be used during initial startup of the communications session to negotiate the $n_{max}$ value that is to be used by modems 26, 34.

As described previously, there are numerous other ways in which this negotiation/renegotiation of the value of $n_{max}$ may be implemented. As has also been described previously, the adjusting of the overhead data transfer rates in system 1 to the new $n_{max}$ value need not occur on the next superframe boundary. It could change in accordance with another message transmitted between the transceivers 26, 34, or it could change only when a counter value of transmitted superframes reaches certain values. It is also possible to establish and exchange many more parameters than just $n_{max}$ and to thus enable a more flexible, albeit more complicated, system.

The proposed framing mode will allow low overhead and high payload efficiency in G.lite systems while maintaining the ability to "open" a high bandwidth clear channel EOC if necessary. On the other hand, if a G.lite system does not require high data rate EOC channel it can simply negotiate it down to less than 2 kbps. This proposal is simple in the sense that the flexibility is achieved by simply negotiating one variable ($n_{max}$).

One application that requires dynamic overhead allocation is the transport of compressed digital voice over the eoc/aoc data in a DSL system. Although DSL systems operate without interrupting POTS on the telephone line on which the DSL service is being offered, the use of the DSL data for transporting virtual second line (or third line, etc.) voice over a single phone line is attractive. This digitized voice traffic is likely to be compressed using any of the conventional industry speech compression techniques to bring the data rate of the compressed speech to below 24 kbps. The EOC/AOC could be "opened up" when a second line voice channel is needed and used to transport the digital voice traffic (as EOC/AOC bytes in the overhead data) by using the on-demand technique described above. During this time, the DSL payload data rate would be decreased. Upon completion of the voice data transmission, the EOC/AOC data rate may be renegotiated so as to be lower, using the adaptive technique described above and the DSL payload data could go back to its higher rate.

The framing method described in accordance with this embodiment of the present invention allows the EOC/AOC channel to be programmed to be within a range between a minimum of approximately 2 kbps and a maximum of approximately 30 kbps, at approximately 2 kbps granularity. The EOC channel data rate can be further increased or decreased by making additional changes to the framing structure. For example, the maximum EOC/AOC overhead data rate could be increased by allowing more that 1 sync byte (or fast byte) per frame. In this case a new variable, "K", that dictates the number of sync bytes (or fast bytes) per frame may be defined, and negotiated by the transceivers at startup and/or during steady state mode. In the case shown in Table 1, K=1, since there is always one EOC/AOC byte per frame. But if K is made to be K=2, then the data rate of the EOC/AOC channel could be doubled, thus allowing a maximum of 60 kbps. With this technique (and also as K is increased to even higher values), the EOC/AOC channel may be increased to utilize all the bandwidth available on the channel if necessary (i.e., no bytes allocated to payload). This could be beneficial if the EOC/AOC channel is intended to be used for lengthy diagnostics tests or modem firmware upgrades during periods of the day or night when the user was not running applications over the modem connection.

Likewise the EOC/AOC channel minimum channel data rate can be further decreased by changing the framing format to allow the EOC/AOC bytes to be allocated to only certain superframes. With this framing format, a superframe counter defined as an 8 bit counter (modulo 256), is employed. The counter therefore counts from 0 to 255 as superframes are transmitted (or received) and thereafter, recommences counting at 0 again. A new variable Smax, may also be used to dictate how many of the 256 superframes contain EOC/AOC data. For example if Smax=8, then the first 8 superframes of the 256 superframes counted contain EOC/AOC data. The remaining 248 superframes would contain payload bytes in the place of EOC/AOC bytes in each frame. In this case, the EOC/AOC channel data rate is decrease by a factor of 8/256 (i.e., by a factor of 0.03125). In general with method, the EOC/AOC channel minimum data rate can be decreased to (2 kbps)/256=0.0078 kbps in the case of a module 256 counter, and may be further decreased by employing larger modulo counters.

In both of the methods described above for further increasing or decreasing the EOC/AOC channel rates, the additional variables, "K" and Smax, may be negotiated by the modems 26, 34 during initialization and/or steady state operation.

While the invention has been disclosed in connection with the preferred embodiments and methods of use, it is to be understood that many alternatives, modifications, and variations thereof are possible without departing from the present invention. Thus, the present invention is intended to embrace all such alternatives, modifications, and variations as may be apparent to those skilled in the art and encompassed within the hereinafter appended claims.

What is claimed is:

1. A transceiver, comprising:
   a physical interface, and wherein the transceiver is configured to:
   control a transmission rate of overhead data by negotiating, with another transceiver, a single parameter during an initialization process or during steady-state communication, wherein the single parameter defines a set of numbered frames that include overhead bytes for a first superframe;
   select the set of frames including the overhead bytes defined by the single parameter for the first superframe;
   determine content of the overhead bytes;

insert the determined content of the overhead bytes to the selected set of frames;
transmit, to the another transceiver, the first superframe via the physical interface; and
renegotiate the single parameter to change an overhead data rate for a second superframe by selection of a different set of the numbered frames that include overhead bytes for the second superframe.

2. The transceiver of claim 1, wherein the transceiver is configured to, in response to renegotiating the single parameter,
select the different set of the numbered frames including the overhead bytes for the second superframe;
determine content for the overhead bytes for the second superframe; and
insert the determined content in the overhead bytes for the second superframe.

3. The transceiver of claim 1, wherein the transceiver is configured to determine the content of the overhead bytes by determining whether at least one of the overhead bytes includes cyclic redundancy check (CRC) data, indicator bit (IB) data, embedded operations channel (EOC) data and ADSL overhead channel (AOC) data.

4. A method, comprising:
negotiating, by a transceiver with another transceiver, a single parameter during an initialization process or during steady-state communication with the another transceiver, wherein the single parameter defines a set of numbered frames that include overhead bytes for a first superframe;
selecting, by the transceiver, the set of frames including the overhead bytes defined by the single parameter for the first superframe;
determining, by the transceiver, content of the overhead bytes;
inserting, by the transceiver, the determined content of the overhead bytes to the selected set of frames;
transmitting, by the transceiver, the first superframe to the another transceiver; and
renegotiating the single parameter to change an overhead date rate for a second superframe by designating a different set of the numbered frames that include overhead bytes for the second superframe.

5. The method of claim 4, further comprising:
in response to renegotiating, by the transceiver, the single parameter, selecting by the transceiver, the different set of the numbered frames including the overhead bytes for the second superframe.

6. The method of claim 4, wherein determining, by the transceiver, content of the overhead bytes includes determining an overhead byte to be one of cyclic redundancy check (CRC) data, indicator bit (IB) data, embedded operations channel (EOC) data and ADSL overhead channel (AOC) data.

7. A transceiver, comprising:
a physical interface, and wherein the transceiver is configured to:
control a reception rate of overhead data by negotiating, with another transceiver, a single parameter during an initialization process or during steady-state communication, wherein the single parameter defines a set of numbered frames that include overhead bytes for a first superframe and wherein the single parameter is configured to be renegotiated to change an overhead date rate for a second superframe to include a different set of the numbered frames that include overhead bytes for the second superframe;
receive, from the another transceiver via the physical interface, the first superframe including a selected set of frames including the overhead bytes defined by the single parameter for the first superframe, wherein the content of the overhead bytes is determined by the another transceiver prior to insertion by the another transceiver of the overhead bytes into the selected set of frames.

8. The transceiver of claim 7, wherein the transceiver is further configured to renegotiate, the single parameter to change the overhead data rate for the second superframe.

9. A system, comprising:
a first transceiver configured to:
negotiate, with a second transceiver, a single parameter during an initialization process or during steady-state communication with the second transceiver, wherein the single parameter defines a set of numbered frames that include overhead bytes for a first superframe;
select the set of frames including the overhead bytes defined by the single parameter for the first superframe;
determine content of the overhead bytes;
insert the determined content of the overhead bytes to the selected set of frames;
transmit the first superframe to the second transceiver; and
renegotiate the single parameter to change an overhead date rate for a second superframe to allow selection of a different set of the numbered frames that include overhead bytes for the second superframe.

10. The system of claim 9, wherein at least one of the first and the second transceiver is configured to select the different set of numbered frames including the overhead bytes for the second superframe in response to a message transmitted between the first and the second transceiver.

11. The system of claim 9, wherein at least one of first and the second transceiver is configured to determine content of the overhead bytes by determining an overhead byte to be at least one of cyclic redundancy check (CRC) data, indicator bit (IB) data, embedded operations channel (EOC) data and ADSL overhead channel (AOC) data.

12. The system of claim 9, wherein the first and the second transceivers are configured to transport compressed digital voice over EOC/AOC data.

13. A tangible non-transitory computer-readable medium, comprising:
a computer-readable medium including program code instructions, which in response to execution by a processor of a transceiver, cause the transceiver to:
negotiate, with another transceiver, a single parameter during an initialization process or during steady-state communication with the another transceiver, wherein the single parameter defines a numbered set of frames that include overhead bytes for a first superframe;
select the set of frames including the overhead bytes defined by the single parameter for the first superframe;
determine content of the overhead bytes;
insert the determined content of the overhead bytes to the selected set of frames;
transmit the first superframe to the another transceiver;
renegotiate the single parameter to change an overhead date rate for a second superframe by selection of a different set of the numbered frames that include overhead bytes for the second superframe.

14. The tangible non-transitory computer-readable medium of claim 13, wherein the transceiver is configured to renegotiate the single parameter based at least in part on a relative priority of overhead data and payload data.

15. The tangible non-transitory computer-readable medium of claim 13, wherein the transceiver is configured to renegotiate the single parameter based at least in part on an overhead data transmission rate requirement of an application.

16. The tangible non-transitory computer-readable medium of claim 15, wherein the application comprises a compressed voice telephony application.

17. The tangible non-transitory computer-readable medium system of claim 13, wherein the program code instructions, in response to execution by the processor, are configured to cause the transceiver to determine content of the overhead bytes by determining an overhead byte to be at least one of cyclic redundancy check (CRC) data, indicator bit (IB) data, embedded operations channel (EOC) data and ADSL overhead channel (AOC) data.

* * * * *